Dec. 11, 1956  M. GREEN  2,773,414
DIRECT READING INTENSITY PHOTOGRAPHIC PHOTOMETER
Filed Feb. 18, 1954  2 Sheets-Sheet 1

*INVENTOR.*
Milton Green

Dec. 11, 1956  M. GREEN  2,773,414
DIRECT READING INTENSITY PHOTOGRAPHIC PHOTOMETER
Filed Feb. 18, 1954  2 Sheets-Sheet 2

*INVENTOR.*
Milton Green

United States Patent Office 2,773,414
Patented Dec. 11, 1956

2,773,414

DIRECT READING INTENSITY PHOTOGRAPHIC PHOTOMETER

Milton Green, Little Silver, N. J., assignor of twelve and one-half percent to David M. Greenberg, Berkeley, Calif., twelve and one-half percent to Max M. Greenberg, New Orleans, La., five percent to Mrs. Jessie Speken, and five percent to William Greenberg, both of Pueblo, Colo.

Application February 18, 1954, Serial No. 411,175

14 Claims. (Cl. 88—14)

The present invention relates, in general to photographic photometry and, in particular, to densitometer apparatus having provision to record light intensity automatically.

Densitometers heretofore used in the art of photographic photometry measured only the light transmittance of the blackening or density that is produced on a photographic film negative by exposure to light. Heretofore, in order to measure light intensity by means of said blackening or density, it was necessary to use a calibration curve in conjunction with the densitometer. Since density equals the logarithm, base 10, of the reciprocal of the transmittance, i. e., $D = \log_{10} 1/T$, the percentage of light transmittance indicated by the densitometer reading was converted into density by plotting on logarithmic coordinate paper. To construct the required calibration curve, a series of photographic exposures is taken in which the exposure time is held constant, but the light intensity of the exposure is varied by known amounts, or ratios, to obtain successive exposures in the series. The curve is then constructed by plotting, on logarithmic coordinate paper, the galvanometer reading of the densitometer, for each exposure, against the light intensity which produced the exposure. Thereafter, the light intensity, which produced a particular blackening in a photographic film negative under study, can be determined by obtaining the densitometer reading for said blackening and then using the calibration curve to obtain the light intensity for said reading.

Therefore, the primary object of the present invention is the provision of a photographic photometering apparatus which obviates the necessity for checking densitometer light transmittance readings of blackening on photographic film negatives against a calibration curve for obtaining measurements of the light intensities which produced said blackenings.

Another object is the provision of photographic photometering apparatus wherein light intensities can be read directly from the apparatus.

A further object is the provision of a densitometer which both measures the transmittance of the blackening produced on the photographic film negative and, in addition, automatically records said transmittance as the logarithm of the intensity of the light which produced the blackening.

A still further object is the provision of a generally improved, efficient and accurate photographic photometering apparatus provided with an extended density scale, an electric scale translator and a scale expander.

For a better understanding of the invention, together with other and further objects thereof, reference is had to the following description taken in connection with the accompanying drawings which illustrate the best mode presently contemplated by me of carrying out my invention:

In the drawings:

Fig. 1. is a schematic diagram of photographic photometering apparatus pursuant to the present invention;

Figure 1:
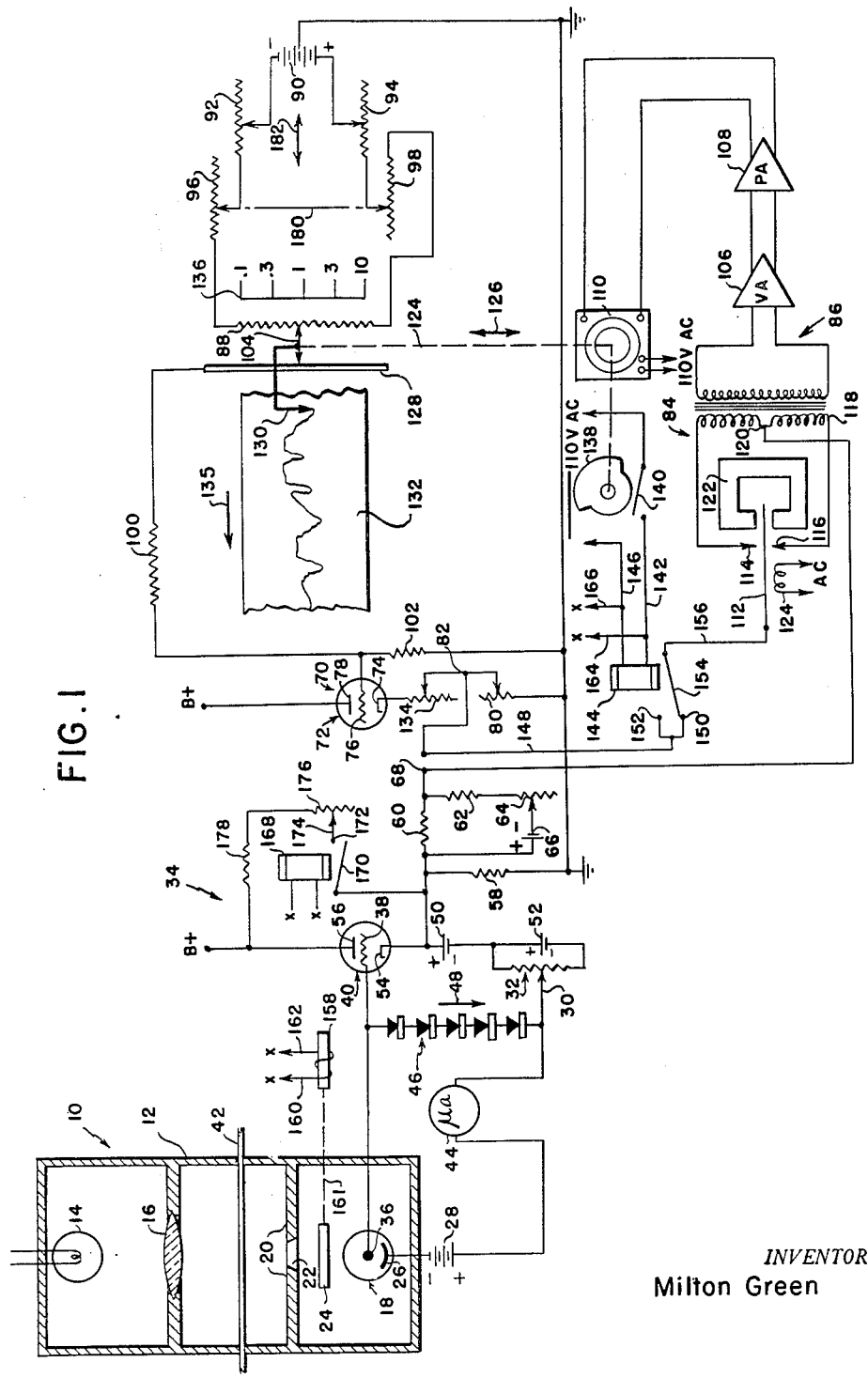

Referring now to Fig. 1 of the drawings in detail, there is shown a circuit diagram of a photometering or densitometer apparatus pursuant to the present invention. The desitometer device 10, of known construction, comprises a light-proof housing 12 which contains a light source 14, a condensing lens 16 and the photoelectric means 18. A wall 20, provided with the light slit 22, is interposed between the lens 16 and the photocell 18 to provide a constricted light opening through which light rays can pass to energize the photo-cell. A neutral density filter 24, the function of which is hereinafter described in detail, may be interposed between the light slit and the photo-cell. The cathode 26 of the photo-cell is connected to the negative terminal of a battery supply 28, the positive terminal of which is connected to the arm 30 of the potentiometer 32 in a logarithmic converter stage, generally indicated by the reference numeral 34. The anode 36 of the photo-cell is connected to the grid 38 of tube 40 in said stage. The housing 12 has provision to pass a film negative 42 between the lens 16 and the light slit 22 to intercept the light which reaches the photo-cell. For optimum results, the photo-cell should have the capacity of delivering 100 microamperes of direct current for the maximum densitometer light flux levels, i. e., for the light which reaches the photo-cell through a clear portion of the film negative. I have found photo-electric multiplier tubes of the commercial types 1P21 and 931A to be satisfactory for this purpose and a micro-ammeter 44 may be connected, as illustrated, to indicate the photo-cell output.

The logarithmic converter 34 is of the type claimed in my co-pending application, Serial No. 362,171, filed June 16, 1953, and includes a plurality of non-linear impedance devices 46, preferably five in number, as illustrated, which are serially connected between the control grid 38 and the potentiometer 32 so that the path of easy current flow in the external circuit of the photo-cell is from the anode 36 to the cathode 26, as indicated by the arrow 48. The devices 46 may be crystal diodes such as that commercially designated as the 1N69 germanium diode. The aforementioned potentiometer 32 and the bias cells 50 and 52 in the circuit of the cathode 54 of tube 40 constitute the bias supply for the tube, the anode 56 thereof being connected to a suitable anode voltage supply.

The photo-cell 18 produces a current flow which is proportional to the light flux incident upon its cathode so that the photo-electric current is proportional to the light flux which is transmitted by that portion of the film negative 42 which is directly over the light entrance slit 22. Consequently, the current through the rectifiers 46, which is equal to the photo-electric current, is also proportional to the light flux transmitted by the film portion overlying the light slit 22. The current flow through the rectifiers 46 causes an increase in the negative voltage difference from the grid to the cathode of the tube 40, and this increased negative bias causes a reduction in the plate to cathode current of said tube. The potentiometer 32 is utilized to adjust the grid to cathode bias of tube 40 so that it operates over the desired range of its cathode current versus grid voltage characteristic curve. The logarithmic converter circuit 34 operates to provide a cathode current output which varies as the logarithm of the input current flowing through the series combination of the rectifiers 46. A detailed explanation of the theory of operation of this circuit is contained in my above identified co-pending application. Since the rectifier or input current of the logarithmic converter is proportional to the transmittance of the film area under measurement, i. e. the film area over the slit 22, and since the cathode current of the logarithmic converter varies as the logarithm of said rectifier current, then it will be apparent that said cathode current varies also as the logarithm of the transmittance of the same film area. Therefore, since photographic density (hereinafter referred to merely as density) equals the logarithm, base 10, of the reciprocal of the transmittance of the film, the cathode current of the tube 40 varies as the film density. Consequently, the voltage drop developed across the cathode resistor 58 by the cathode current flow therethrough, varies also as the film density.

The fixed resistors 60 and 62, the variable resistor 64, and the battery 66 provide a "bucking" or biasing circuit so as to permit an adjustment to zero for the potential or voltage difference between the point 68 and ground when the density of the clear or unblackened film is zero; that is, when 100 microamperes of photoelectric current are flowing through the rectifiers 46 as indicated on the meter 44 for a clear film area over the slit 22, this makes the potential drop from point 68 to ground, not only "vary as" but also proportional to the density of the film 42. More specifically, when the density of the film area under measurement is zero the voltage between point 68 and ground is also zero and, when the density increases, the voltage between point 68 and ground increases in proportion to the increase in the density.

An intensity converter stage is indicated generally by the reference numeral 70. Said stage includes the tube 72 provided with the cathode 74, the control grid 76 and the anode 78. Current flow through the tube 72 will provide a voltage drop across the resistor 80 in the cathode circuit. The point 82 in the cathode circuit of the intensity converter is in circuit with the point 68 in the output of the logarithmic converter and the circuit between said points includes a conversion stage 84 of a continuous balance system, indicated generally by the reference numeral 86. The potential difference between the points 68 and 82 contributes the input voltage for said balance system. When the voltages between each of the points 68 and 82 and ground are equal the circuit between said points is in balance and there is no current flow between said points. In this balanced condition, the voltage drop across resistor 80 is proportional to the cathode current in tube 72. In said state of balance, the voltage at point 82 is proportional to density since it is equal to the voltage at point 68. Therefore the cathode current of the tube 72 is also proportional to density in the balanced condition of the circuit. Since the magnitude of this cathode current is governed by the voltage at the grid 76 of tube 72, provision is made for a slide wire potentiometer circuit to balance the circuit between points 68 and 82. Said balancing circuit comprises the slide wire potentiometer 88, and the battery 90 connected across the slide wire by the variable resistors 92, 94, 96 and 98 (the function of which is hereinafter described in detail), said wire potentiometer circuit being connected to the grid 76 through the resistors, 100 and 102. While the slide 104 could be adjusted manually to vary the grid voltage of the tube 72 for balancing the circuit between points 82 and 68, this is accomplished automatically by means of the previously referred to continuous balance system 86.

The continuous balance system or apparatus 86, illustrated herein, is of known construction and the operation thereof is described in detail in Technical Bulletin No. 15-6 of the Minneapolis-Honeywell Regulator Company, Philadelphia, Pa. Briefly described, said system comprises the previously mentioned conversion stage 84, a voltage amplifier 106, a power amplifier 108 and a balancing motor 110. When a state of unbalance exists between the points 68 and 82, there is a D. C. voltage difference between these points, as described, which is applied as an input to the conversion stage 84. This stage includes a metal reed 112 which oscillates between the contacts 114 and 116 connected to the opposite ends of the primary of transformer 118. The unbalance D. C. voltage is impressed upon the transformer between the reed 112 and the center tap 120 of the primary winding. A permanent magnet 122 polarizes the reed and an energizing coil 124, which is connected to an A. C. voltage source, actuates the reed to oscillate in synchronism with the A. C. supply voltage. Therefore, the D. C. voltage between points 82 and 68 is converted into alternating voltage in the transformer secondary, having a frequency of the voltage which energizes the coil 124. The output voltage of the secondary is amplified by the voltage and power amplifiers 106 and 108, respectively, and applied to the motor 110. Said motor is a two-phase reversible induction motor, one phase winding of which is connected to the output of amplifier 108 and the other phase winding being connected to the A. C. line voltage supply, the frequency supplied to both phases being the same. The direction of rotation of the motor depends on the phase, 0° or 180° of the voltage from the amplifier which, in turn, depends on the polarity of the voltage difference between the points 68 and 82. The motor 110 is mechanically connected to the slide 104, as indicated diagrammatically at 124, to effect movement of the slide in opposite directions, as indicated by the arrows 126. The electrical connections to the motor 110 are phased so as to cause it to rotate in the direction that drives the slide to the position of balance. A changing light flux on the photo-tube cathode 26 caused by the variation in density along the film 42 as the latter is moved past the light slit 22, causes the state of unbalance of the circuit between 68 and 82. One end of the slide 104 slides on a brass or copper rod 128 to achieve a good electrical contact between resistor 100 and slide wire 88. A recording pen 130 is rigidly attached to, but electrically insulated from, slide 104. A chart 132 is suitably driven in the direction of the arrow 135 past the pen 130 and the movement of the latter is recorded on the chart as it moves to a balancing position.

The slide wire 88 is a linear resistor so that the resistance and hence, for the circuit shown, the voltage varies as the distance from one end of the wire. When the resistors 80, 134, 88, 100 and 102 are of proper values or magnitudes then, for the condition of balance, this voltage, for any point on the slide wire resistor 88, varies as the logarithm of the intensity of exposure of the light that produced the photographic density in the film. Correspondingly, the distance or displacement of the slide 104 along the wire 88 varies as the logarithm of the intensity of the light exposure producing the density on the film. Thus the logarithmic scale 136, once calibrated, will measure this relative intensity. A linear scale, not calibrated, will measure a distance proportional to the logarithm of the intensity of exposure.

Figure 2:
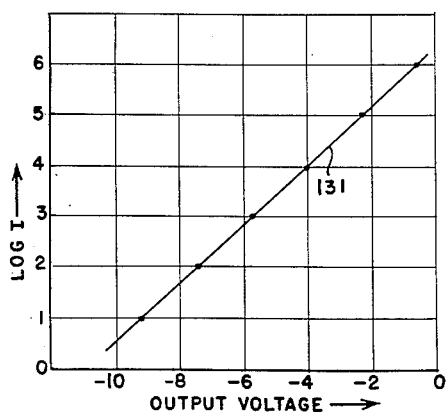
Fig. 2 illustrates a curve in which the output voltage of the recorder of the apparatus of Fig. 1 is plotted against the logarithm of the light intensity corresponding to the blackening or density on a photographic film negative.

The curve of Fig. 2 illustrates that the direct reading intensity photographic photometer of the present invention is linear with the logarithm of the light intensity. A sequence of six exposures was made on a photographic film. The exposure time was held constant for each exposure but the light intensity for said exposures was varied in a geometric progression. The film was developed and the blackened portions were measured by the densitometer 10. An output voltage was obtained at the slide 104 of the recorder for each exposure and said output voltages were plotted against the numerical order of the exposures. The resultant linear curve 131 in Fig. 2 indicates that the output voltage of the recorder is linear with the logarithm of the light intensity corresponding in each case to the blackening or density on the film negative on which the densitometer measurements were made.

Figure 4:
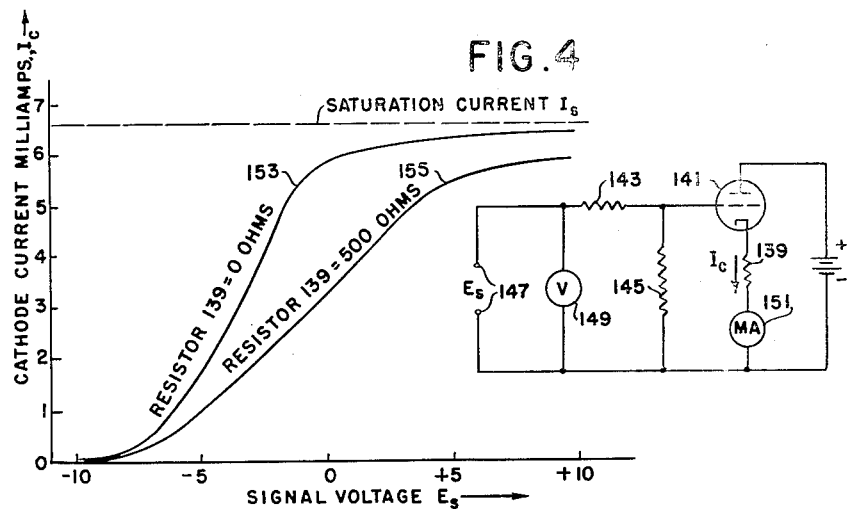
Fig. 4 illustrates two typical cathode current-signal voltage curves for different values of cathode resistance of the triode circuit shown therein.
Figure 3:
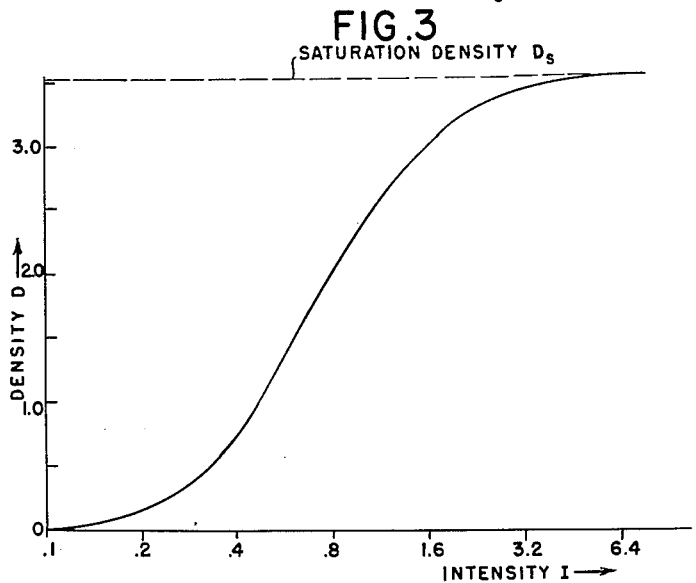
Fig. 3 illustrates a typical calibration curve for a photographic emulsion in which the density is plotted against the logarithm of intensity of exposure, the time of exposure being held constant.

In order to explain the linear relationship between the voltage along the slidewire potentiometer 88 and the logarithm of the exposure intensity, as shown by the curve 131 of Fig. 2, reference is had to Figs. 3 and 4. Fig. 3 illustrates a typical calibration curve of a photographic emulsion in which the density is plotted against the logarithm of intensity of exposure, the time of exposure being held constant. Fig. 4 illustrates two typical curves, corresponding to resistance values of 0 and 500 ohms for the cathode resistor 139 in the triode circuit illustrated in said figure. In said triode circuit which corresponds to the circuit of the triode 72 of the intensity converter, the tube 141 may be of any suitable type, preferably one-half of the commercially designated type 5692, the other half of which would be the triode 40, with the resistors 143 and 145, corresponding to the resistors 100 and 102, each one megohm. The signal input terminals are indicated at 147. The voltmeter 149 is connected across the signal input terminal and the milliammeter 151 is connected in the cathode circuit. The plate voltage supply is set at 75 volts. The curve 153 is the cathode current signal voltage curve with the resistor 139, corresponding to the series resistors 134 and 80, equal to zero and the curve 155 is taken with said resistor 139 equal to 500 ohms. Comparing Figs. 3 and 4 it will be noted that the photographic characteristic curve of Fig. 3 and the electrical characteristic curve of Fig. 4 are quite similar. A mathematical examination has shown that, over most of their range, these curves are similar and that this range, over which they are similar, is the useful range in photographic photometry. Over the range for which the two curves are similar, the density D of the photographic calibration curve in Fig. 3 is proportional to the cathode current Ic of the triode characteristic curve in Fig. 4, and units of the logarithm of the intensity scale I of the photographic curve in Fig. 3 are proportional to volts on the electric abscissa Es in Fig. 4. The saturation density Ds of Fig. 3 is proportional to the saturation currents Is of Fig. 4. (For similar curves only, when there is some departure from similarity a value of saturation current Is must be determined by extrapolation from the portion of the electrical characteristic curve for which similarity does exist.) Thus the proportionality between density D and cathode current Ic is determined, that is, $D/Ic = Ds/Is$. This proportionality factor $Ds/Is$ makes possible the determination of the value of the cathode resistor 80 in the intensity converter stage so that the corresponding points of the photographic characteristic curve of Fig. 3 and the electrical characteristic curve of Fig. 4 can be made to coincide instrumentally.

The variable resistor 134 makes it possible to change the slope of the electrical characteristic curve so that it will correspond to the gammas (slope or contrast) of the photographic characteristic curves of various photographic emulsions or of various methods of film processing, or of exposures of various spectral energy distributions of light sources. This allows for the use of a single calibration scale 136 for all emulsions, provided the appropriate values of resistance for both the resistors 80 and 134 are determined for each emulsion and processing condition.

Since the logarithmic converter stage 34 is "logarithmic" only over two decade cycles, the apparatus of Fig. 1 ordinarily allows for a density range of only two units without the use of the previously mentioned density filter 24. Where it is desired to extend the density range, provision is made for use of the previously mentioned density filter 24 having a density of one or two units depending on whether the desired range of density to be covered is three or four units, respectively. If the density range is to extend beyond four units, an additional neutral filter of two units is required for each arithmetical increase in density range by two units. The mechanism for extending the density scale includes a cam 138 driven by the motor 110. Said cam operates a normally open microswitch 140, one end of which is connected to the A. C. line source and the other is connected by the lead 142 to the relay 144. The lead 146 connects the relay to the A. C. line source. The previously identified circuit point 82 is connected by the lead 148 to the spaced stationary contacts 150 and 152. The movable contact 154 of relay 144 is engaged with the contact 150 in the unenergized condition of the relay and said movable contact is connected by lead 156 to the previously mentioned reed 112. The solenoid 158 which has its armature connected to the filter 24, as at 161, is connected by the leads 160 and 162 to the branches 164 and 166, respectively, of the leads 142 and 146. In the unenergized condition of the solenoid 158, the filter 24 is positioned, as illustrated, between the light slit 22 and the photo-cell 18. A relay 168 is also connected to the branches 164 and 166. Said latter relay operates the movable contact 170 which is connected to the cathode 54 of the tube 40 of the logarithmic converter circuit. The stationary contact 172 is connected to the arm 174 of the potentiometer 176. Said potentiometer is connected to the plate 56 through the resistor 178. In the unenergized condition of the relay 168, the contacts 170 and 172 are disengaged.

When the density of the area of film 42, overlying the slit 22, rises from a value under two to a value of two units, the motor 110 drives the cam 138 to a position where it closes the microswitch 140. The closing of the microswitch connects the relays 144, 158 and 168 to the A. C. line source and energizes said relays. The energization of relay 144 causes the movable contact 154 to disengage the contact 150 and to engage the contact 152. This momentarily breaks the circuit between circuit point 82 in the intensity converter circuit and the reed 112 so that the motor 110 remains stationary during the time that contact 154 moves from contact 150 to contact 152. Since the motor 110 is stationary during this interval, the slide 104 and the recording pen 130 are also stationary and remain during this interval at a position corresponding to density two. The energization of solenoid 158 results in the withdrawal of the filter 24 from the light path between the slit 22 and the photocell 18, and, as stated, the pen 130 is not recording during this interval due to the momentary circuit break in the circuit of reed 112. At the same time that the filter 24 is being withdrawn, the relay 168 closes the contacts 170 and 172 and this completes a circuit between the plate 56 of tube 40 to the cathode resistor 58, to provide a current flow through the resistor 58, the potentiometer 176 and the resistor 178 to the plate supply. The magnitude of this current is originally pre-set by the adjustment of the potentiometer 176, when the apparatus is placed in operation, so that the same current flows through the cathode resistor 58 as had been flowing through it before filter 24 had been withdrawn from the light path. As soon as the contact 154 closes with the contact 152, the motor 110 resumes its operation to operate the slide 104 and the recording pen 130. When the film area over the slit 22 passes from a density above two units to a density below two units, the motor 110 operates the cam 138 in the opposite direction to permit the microswitch 140 to open. This results in the de-energization of the relays 144, 158 and 168. The movable contact 154 disengages contact 152 to engage contact 150 and during said interval the motor 110, the slide 104 and the pen 130 are stationary. The de-energization of the relay 158 results in the return of the filter 24 to its operative position, as illustrated, during the momentary de-energization of the motor 110, and the de-energization of the relay 168 opens the switch contacts 170—172.

Provision is made also in the apparatus of the present invention for an electric scale translation and scale expansion. In this connection, the previously identified potentiometers 96 and 98 have their variable arms ganged for concomitant operation, as by a rod 180 which connects said arms but which is electrically insulated therefrom. A mechanical displacement of the rod 180 in the directions of the arrows 182 produces equal changes, of opposite polarity, in the amount of resistance injected, from the potentiometers 96 and 98, in series with the slide wire potentiometer 88, and consequently produces no net change in the total resistance of the circuit. Thus the potential drop across the slide wire 88 remains constant whereas the potential of each point, on the slide wire 88 is shifted by a fixed amount with respect to ground whereby to translate electrically the position of the potentials existing across the slide wire 88. Consequently it will be apparent that the potentiometers 96 and 98 provide a scale shifter means which permits, electrically, the setting of any value of density, within limits to correspond to unit intensity on the graduated scale 136.

Potentiometers 92 and 94 permit individually the injection or extractions of resistance from the series circuit containing the slide wire potentiometer 88. This will decrease or, correspondingly, increase the potential drop across slide wire 88. The result, correspondingly, is to expand or to contract the equivalent logarithmic intensity scale 136.

While the described apparatus measures and records the logarithm of the intensity that produced the blackening or density on a film negative under test it can also be used as a conventional transmittance meter or conventional densitometer, as well as for directly measuring densities. The microammeter 44 operates in connection with the photo-cell 18 to constitute a conventional densitometer to provide readings of the transmittance currents which result from the transmittance of light by the film area under test. Densities can be measured directly between circuit point 68 at the output of the logarithmic converter 34, and ground by applying the voltage difference to a suitable recorder or meter which is calibrated in density units.

While the present invention has been illustrated and described in connection with a photographic film negative, as the medium under test or measurement, for recording the light intensity which produces or resulted in a predetermined blackening or density thereof, it will be understood that the present invention is not limited to photographic media but may be used generally in connection with testing or measuring other media having varying degrees of light transmittance.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. A photographic photometer comprising means responsive to the light transmittance of a medium of predetermined density to provide a signal proportional to the logarithm of said light transmittance, a thermionic tube circuit having parameters to provide a current output curve which corresponds to the density versus logarithm of intensity of exposure photographic curve, said tube having a variable voltage source connected to its input circuit to provide signal output therefrom, means operable in response to the difference between said first mentioned signal and said signal output to vary the voltage applied to said input circuit to equalize the signal output from said tube with said first mentioned signal, whereby the magnitude of said applied voltage is proportional to the logarithm of the intensity of the light which produced the density of said medium.

2. A photographic photometer comprising means responsive to the light transmittance of a medium of predetermined density to provide a signal proportional to the logarithm of said light transmittance, a thermionic tube circuit having parameters to provide a current output curve which corresponds to the density versus logarithm of intensity of exposure photographic curve, said tube having a variable voltage source connected to its input circuit to provide signal output therefrom, means operable in response to the difference between said first mentioned signal and said signal output to vary the voltage applied to said input circuit to equalize the signal output from said tube with said first mentioned signal, whereby the magnitude of said applied voltage is proportional to the logarithm of the intensity of the light which produced the density of said medium, and means to automatically measure said applied voltage on a scale calibrated in light intensity values.

3. A photographic photometer comprising means responsive to the light transmittance of a medium of predetermined density to provide a signal proportional to the logarithm of said light transmittance, a thermionic tube circuit having parameters to provide a current output curve which corresponds to the density versus logarithm of intensity of exposure photographic curve, said tube having a variable voltage source connected to its input circuit to provide signal output therefrom, means operable in response to the difference between said first mentioned signal and said signal output to vary the voltage applied to said input circuit to equalize the signal output from said tube with said first mentioned signal, whereby the magnitude of said applied voltage is proportional to the logarithm of the intensity of the light which produced the density of said medium, and means for obtaining a recording of the applied voltage.

4. A photographic photometer comprising means responsive to the light transmittance of a medium of predetermined density to provide a signal proportional to the logarithm of said light transmittance, a thermionic tube circuit having parameters to provide a current output curve which corresponds to the density versus logarithm of intensity of exposure photographic curve, said tube having a variable voltage source connected to its input circuit to provide signal output therefrom, means operable in response to the difference between said first mentioned signal and said signal output to vary the voltage applied to said input circuit to equalize the signal output from said tube with said first mentioned signal, whereby the magnitude of said applied voltage is proportional to the logarithm of the intensity of the light which produced the density of said medium, and means responsive to the magnitude of said first mentioned signal for automatically changing the density range of said apparatus, whereby to increase or to decrease the density range thereof.

5. A photographic photometer comprising means responsive to the light transmittance of a medium of predetermined density to provide a signal proportional to the logarithm of said light transmittance, a thermionic tube circuit having parameters to provide a current output curve which corresponds to the density versus logarithm of intensity of exposure photographic curve, said tube having a variable voltage source connected to its input circuit to provide signal output therefrom, means operable in response to the difference between said first mentioned signal and said signal output to vary the voltage applied to said input circuit to equalize the signal output from said tube with said first mentioned signal, whereby the magnitude of said applied voltage is proportional to the logarithm of the intensity of the light which produced the density of said medium, and means to automatically measure said applied voltage on a scale calibrated in light intensity values, said intensity values being graduated in terms of a predetermined unit of light intensity for a corresponding unit of density, and means for electrically translating the value of said intensity unit for a change in the value of said density unit.

6. A photographic photometer comprising means responsive to the light transmittance of a medium of predetermined density to provide a signal proportional to the logarithm of said light transmittance, a thermionic tube circuit having parameters to provide a current output curve which corresponds to the density versus logarithm of intensity of exposure photographic curve, said tube having a variable voltage source connected to its input circuit to provide signal output therefrom, means operable in response to the difference between said first mentioned signal and said signal output to vary the voltage applied to said input circuit to equalize the signal output from said tube with said first mentioned signal, whereby the magnitude of said applied voltage is proportional to the logarithm of the intensity of the light which produced the density of said medium, and means to automatically measure said applied voltage on a scale calibrated in light intensity values, said scale being a logarithmic intensity scale, and means to electrically expand and contract said scale.

7. Apparatus of the character described comprising a light source, photo-electric means for receiving light from said source through a medium under test, a thermionic tube having its input circuit connected across the output of said photo-electric means, said thermionic tube having parameters such that the current output of said tube is proportional to the logarithm of the input circuit current, a second thermionic tube circuit having a variable linear potentiometer in its control grid input circuit, a source of voltage connected to said potentiometer, said second tube having parameters to provide a current output curve therefor which corresponds to the density versus logarithm of intensity of exposure photographic curve, and a continuous balance circuit having its input connected to the outputs of both of said tubes and operable in response to an unbalance between the voltage outputs of said tubes to vary said potentiometer in a direction to make the voltage output of said second tube equal to the voltage output of said first tube and means to indicate the setting of said potentiometer at the condition of balance of the voltage ouputs of said tubes, whereby to provide an indication of the intensity of the light which produced the density of the medium under test.

8. Apparatus of the character described comprising a light source, photo-electric means for receiving light from said source through a medium under test, a thermionic tube having its input circuit connected across the output of said photo-electric means, said thermionic tube having parameters such that the current output of said tube is proportional to the logarithm of the input circuit current, a second thermionic tube circuit having a variable linear potentiometer in its control grid input circuit, a source of voltage connected to said potentiometer, said second tube having parameters to provide a plate current versus grid signal voltage operating curve therefor which corresponds to the density versus logarithm of intensity of exposure photographic curve, and a continuous balancer circuit having its input connected to the cathode circuits of both said tubes and operable in response to an unbalance between the cathode voltage outputs of said tubes to vary said potentiometer in a direction to make the cathode voltage output of said second tube equal to the cathode voltage output of said first tube and means to indicate the setting of said potentiometer at the condition of balance of the cathode voltage outputs of said tubes, whereby to provide an indication of the intensity of the light which produced the density of the medium under test.

9. Apparatus of the character described comprising a light source, photo-electric means for receiving light from said source through a medium under test, a thermionic tube having its input circuit connected across the output of said photo-electric means, said thermionic tube having parameters such that the current output of said tube is proportional to the logarithm of the input circuit current, a second thermionic tube circuit having a variable linear potentiometer in its control grid input circuit, a source of voltage connected to said potentiometer, said second tube having parameters to provide a current output curve therefor which corresponds to the density versus logarithm of density of exposure photographic curve, and a continuous balancer circuit having its input connected to the outputs of both of said tubes and operable in response to an unbalance between the voltage outputs of said tubes to vary said potentiometer in a direction to make the voltage output of said second tube equal to the voltage output of said first tube, said balancing circuit including a motor for operating the variable arm of said potentiometer to effect a continuous balance of the voltage outputs of said tubes, and calibrated logarithmic intensity scale for indicating the position of said variable arm at the balance of said tube outputs, whereby to indicate the intensity which corresponds to the density of said medium.

10. Apparatus as defined in claim 9, further characterized in the provision of a density filter disposed between the light source and the photo-electric means, and means operable under the control of said motor for withdrawing said filter from said position and for returning said filter to said position in response to the output of said photo-electric means.

11. Apparatus as defined in claim 9, further characterized in that the intensity values on said scale are graduated in terms of a predetermined unit of light intensity for a corresponding unit of density, and a variable resistor in series circuit between each end of said potentiometer and a point of opposite polarity relative to ground in said voltage source, and said variable resistors being ganged for concomitant operation for electrically translating the value of said intensity unit for a change in the value of said density unit.

12. Apparatus as defined in claim 9, further characterized in the provision of a variable resistor in series circuit between each end of said potentiometer and a point of opposite polarity relative to ground in said voltage source, and said variable resistors being independently operable for electrically expanding and controlling said scale.

13. Apparatus as defined in claim 9, further characterized in the provision of a density filter disposed between the light source and the photo-electric means, and means operable under the control of said motor for withdrawing said filter from said position and for returning said filter to said position in response to the output of said photo-electric means, and means for temporarily interrupting said balancing circuit during the withdrawal and insertion of said filter.

14. Apparatus of the character described comprising a light source, photo-electric means for receiving light from said source through a medium under test, a thermionic tube having its input circuit connected across the output of said photo-electric means, said thermionic tube having parameters such that the current output of said tube is proportional to the logarithm of the input circuit current, a second thermionic tube circuit having parameters to provide a current output curve therefor which corresponds to the density versus logarithm of intensity of exposure photographic curve, and means for operating said second tube under the control of the output of said first tube to equalize the outputs of said tubes for obtaining an indication of the intensity of the light which produced the density of the medium under test.

References Cited in the file of this patent
UNITED STATES PATENTS

| | | |
|---|---|---|
| 2,086,964 | Shepard | July 13, 1937 |
| 2,406,716 | Sweet | Aug. 27, 1946 |
| 2,417,023 | Sweet | Mar. 4, 1947 |